(12) United States Patent
Singh et al.

(10) Patent No.: US 12,423,609 B2
(45) Date of Patent: Sep. 23, 2025

(54) AUTOMATIC ACTIVATION AND CONFIGURATION OF ROBOTIC PROCESS AUTOMATION WORKFLOWS USING MACHINE LEARNING

(71) Applicant: UiPath, Inc., New York, NY (US)

(72) Inventors: Prabhdeep Singh, Bellevue, WA (US); Anton McGonnell, Bellevue, WA (US)

(73) Assignee: UiPath, Inc., New York, NY (US)

( * ) Notice: Subject to any disclaimer, the term of this patent is extended or adjusted under 35 U.S.C. 154(b) by 1146 days.

(21) Appl. No.: 16/707,814

(22) Filed: Dec. 9, 2019

(65) Prior Publication Data
US 2021/0110207 A1     Apr. 15, 2021

Related U.S. Application Data

(60) Provisional application No. 62/915,379, filed on Oct. 15, 2019.

(51) Int. Cl.
*G06N 20/00*     (2019.01)
*G06F 18/21*     (2023.01)
(Continued)

(52) U.S. Cl.
CPC ......... *G06N 20/00* (2019.01); *G06F 18/2148* (2023.01); *G06F 18/2178* (2023.01);
(Continued)

(58) Field of Classification Search
CPC ......... G06N 20/00; G06N 7/01; G06N 20/20; G06N 3/006; G06N 5/043; G06F 18/2148;
(Continued)

(56) References Cited

U.S. PATENT DOCUMENTS 9,195,955 B2   11/2015   Bonnard et al.
10,270,644 B1   4/2019   Valsecchi et al.
(Continued)

FOREIGN PATENT DOCUMENTS

| CN | 108352339 A | 7/2018 |
| CN | 109426543 A | 3/2019 |
| EP | 3564871 A1 | 11/2019 |

OTHER PUBLICATIONS

Dmitry Khramov, Robotic and machine learning: How to help support to process customer tickets more effectively [online], Apr. 12, 2018 [retrieved on Aug. 1, 2023], Retrieved from the Internet :< URL: https://www.theseus.fi/bitstream/handle/10024/143200/Khramov_Dmitry.pdf?sequence=1&isAllowed=y > (Year: 2018).*

(Continued)

*Primary Examiner* — Adam R Mott
*Assistant Examiner* — Ricardo I Viscarra
(74) *Attorney, Agent, or Firm* — LeonardPatel PC; Michael A. Leonard, II; Sheetal S. Patel (57) ABSTRACT

Automatic activation and configuration of robotic process automation (RPA) workflows using machine learning (ML) is disclosed. One or more parts of an RPA workflow may be turned on or off based on one or more probabilistic ML models. RPA robots may be configured to modify parameters, determine how much of a certain resource to provide, determine more optimal thresholds, etc. Such RPA workflows implementing ML may thus be hybrids of both deterministic and probabilistic logic, and may learn and improve over time by retraining the ML models, adjusting the confidence thresholds, using local/global confidence thresholds, providing or adjusting modifiers for the local confidence thresholds, implement a supervisor system that monitors ML model performance, etc.

20 Claims, 8 Drawing Sheets

(51) Int. Cl.
*G06F 18/214* (2023.01)
*G06N 7/01* (2023.01)
*G06N 20/20* (2019.01)
*G06V 10/778* (2022.01)

(52) U.S. Cl.
CPC .............. *G06N 7/01* (2023.01); *G06N 20/20* (2019.01); *G06V 10/7784* (2022.01)

(58) Field of Classification Search
CPC . G06F 18/2178; G06F 18/25; G06V 10/7784; G06V 10/7747; G06V 10/80; B25J 9/161
See application file for complete search history.

(56) References Cited

U.S. PATENT DOCUMENTS

| | | | |
|---|---|---|---|
| 2016/0366036 A1* | 12/2016 | Gupta | G06F 3/0481 |
| 2017/0082555 A1* | 3/2017 | He | G06N 20/20 |
| 2018/0241881 A1 | 8/2018 | Li et al. | |
| 2019/0102452 A1* | 4/2019 | Dayan | G06F 16/258 |
| 2019/0138596 A1* | 5/2019 | Singh | G06F 16/84 |
| 2019/0163594 A1* | 5/2019 | Hayden | G06F 11/3024 |
| 2019/0180746 A1* | 6/2019 | Diwan | G10L 15/22 |
| 2019/0205761 A1* | 7/2019 | Wu | G06F 16/353 |
| 2019/0317805 A1* | 10/2019 | Metsch | G06N 3/08 |
| 2019/0362269 A1* | 11/2019 | Barad | G06N 20/20 |
| 2020/0180148 A1* | 6/2020 | S Nanal | G05B 19/0423 |
| 2020/0333777 A1* | 10/2020 | Maruyama | G06N 7/01 |

OTHER PUBLICATIONS

Dmitry Khramov, Robotic and machine learning: How to help support to process customer tickets more effectively [online], Apr. 12, 2018 [retrieved on Aug. 1, 2023], Retrieved from the Internet :< URL: https://wantheseus.fi/bitstream/handle/10094/143200/ Khramov Dmitry odf?sequence=1 &isAllowed=v > (Year: 2018).*
Kobayashi, et al., "Using Self-Learning RPA to Automate a Greater Range of Business Tasks", Hitachi Initiatives for Creating New Work Styles, Hitachi Review vol. 67, No. 6, pp. 49-53 (Year: 2018).*
Anna Wroblewska et al., "Robotic Process Automation of Unstructured Data with Machine Learning," In: Position Papers of the Federated Conference on Computer Science and Information Systems, vol. 16, pp. 9-16 (Sep. 2018).
Junxiong Gao et al., "Automated Robotic Process Automation: A Self-Learning Approach," In: OTM 2019: On the Move to Meaningful Internet Systems: OTM 2019 Conferences, pp. 95-112 (Oct. 11, 2019).
Pavel Kaarnijoki, "Intelligent Automation: Assessing artificial intelligence capabilities potential to complement robotic process automation," Tampere University, Master of Science Thesis (Jan. 2019).
Yoshiyuki Kobayashi et al., "Using Self-learning RPA to Automate a Greater Range of Business Tasks," Hitachi Initiatives for Creating New Work Styles 2018, vol. 67, No. 6, available at https://www.hitachi.com/rev/archive/2018/r2018_06/06a03/index.html (last accessed Dec. 6, 2019).
First Examination Report issued in Indian Application No. 202217022283 on Jun. 16, 2023.
Kobayashi et al., "Using Self-learning RPA to Automate a Greater Range of Business Tasks," Hitachi Review vol. 67, No. 6, pp. 676-677 (Oct. 31, 2018).
Pavel Kaarnijoki, "Intelligent Automation Assessing artificial intelligence capabilities potential to complement robotic process automation," Faculty of Engineering and Natural Sciences, Tampere University of Technology, Master of Science Thesis (Jan. 2019).
Extended European Search Report issued in European Application No. 20877501.5 on Oct. 12, 2023.
Pavel Kaarnijoki, "Intelligent Automation: Assessing artificial intelligence capabilities potential to complement robotic process automation," Faculty of Engineering and Natural Sciences, Master of Science Thesis (Jan. 2019).
Kaarnijoki, "Intelligent Automation Assessing Artificial Intelligence Capabilities Potential to Complement Robotic Process Automation", University of Tampere, Master of Science Thesis, Jan. 2019.
Kobayashi, et al., "Using Self-Learning RPA to Automate a Greater Range of Business Tasks", Hitachi Initiatives for Creating New Work Styles, Hitachi Review vol. 67, No. 6, pp. 49-53.
Office Action, issued Aug. 14, 2024, CN Patent Application No. 202080072406.4.
Office Action, issued Mar. 1, 2025, CN Patent Application No. 202080072406.4.
Search Report, issued Aug. 14, 2024, CN Patent Application No. 202080072406.4.
Office Action, issued Jul. 14, 2025, CN Patent Application No. 202080072406.4.

* cited by examiner

AUTOMATIC ACTIVATION AND CONFIGURATION OF ROBOTIC PROCESS AUTOMATION WORKFLOWS USING MACHINE LEARNING

CROSS-REFERENCE TO RELATED APPLICATION

This application claims the benefit of U.S. Provisional Patent Application No. 62/915,379 filed Oct. 15, 2019. The subject matter of this earlier filed application is hereby incorporated by reference in its entirety.

FIELD

The present invention generally relates to robotic process automation (RPA), and more specifically, to automatic activation and configuration of RPA workflows using machine learning (ML).

BACKGROUND

Current RPA workflows are deterministic in nature. In other words, the workflows follow a series of logical steps similar to a flowchart. However, this deterministic logic may not be optimal for all situations, and particularly those that change over time. Accordingly, an improved solution may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic activation and configuration of RPA workflows using ML.

In an embodiment, a computer-implemented method includes calling at least one ML model, by an RPA robot, when executing a probabilistic activity of an RPA workflow and receiving, by the RPA robot, at least one confidence value from the at least one ML model. When the at least one confidence value does not exceed a confidence threshold, the computer-implemented method includes turning off, not taking, or otherwise logically avoiding a workflow section after the probabilistic activity, by the RPA robot. When the at least one confidence value exceeds the confidence threshold, the computer-implemented method includes turning on, taking, or otherwise logically following a workflow section after the probabilistic activity, by the RPA robot, and executing the workflow section following the probabilistic activity, by the RPA robot.

In another embodiment, a computer program is embodied on a non-transitory computer-readable medium. The program is configured to cause at least one processor to call an ML model when executing a probabilistic activity of an RPA workflow and receive a confidence value from the ML model. When the confidence value does not exceed a confidence threshold, the program is configured to cause the at least one processor to turn off, not take, or otherwise logically avoid a workflow section after the probabilistic activity. When the confidence value exceeds the confidence threshold, the program is configured to cause the at least one processor to turn on, take, or otherwise logically follow a workflow section after the probabilistic activity, and execute the workflow section following the probabilistic activity.

In yet another embodiment, a computer-implemented method includes calling at least one ML model, by an RPA robot, when executing a probabilistic activity of an RPA workflow and receiving, by the RPA robot, at least one confidence value from the at least one ML model. The computer-implemented method also includes comparing the at least one confidence value to a plurality of confidence threshold ranges, by the RPA robot. When the at least one confidence value falls within a confidence threshold range, the computer-implemented method includes turning on, taking, or otherwise logically following a workflow section after the probabilistic activity for that confidence threshold range, by the RPA robot, and executing the workflow section following the probabilistic activity for that confidence threshold range, by the RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to automatic activation and configuration of RPA workflows using ML. In some embodiments, one or more parts of an RPA workflow may be turned on or off based on one or more probabilistic ML models. In certain embodiments, ML models may be configured to modify parameters, determine how much of a certain resource to provide (e.g., how much electrical current to send, how much water to allow through a dam, what price to set a product at, etc.), determine more optimal thresholds, etc. Such RPA workflows implementing ML may thus be hybrids of both deterministic and probabilistic logic, and may learn and improve over time by retraining the ML models, adjusting the confidence thresholds, using local/global confidence thresholds, providing or adjusting modifiers for the local confidence thresholds, implement a supervisor system that monitors ML model performance, etc.

Workflows include sequences of activities that each accomplish more granular parts of a larger task. Typically, an activity leads directly to another activity or follows conditional branching logic that leads to a section of a sequence when an associated static condition is met. However, some embodiments utilize trainable/retrainable ML models that control whether a part of a workflow is enabled (i.e., "activated") or disabled based on a learned probabilistic threshold, such as using confidence intervals, rather than always proceeding to a next activity or selecting activities based on a deterministic condition, for example. Such activation thresholds may be learned and/or reconfigured over time based on data from robots executing the workflow. For example, the RPA robot may start with the workflow running in a deterministic manner, and then learn to turn one or more sections of the workflow on or off over time, modify activity parameters, determine how much of one or more resources to provide, change thresholds, or any combination thereof.

Thresholds may be set based on one or more factors, such as importance, risk, cost, danger to life, etc. Thresholds for mission critical systems, for instance, may be very high (e.g., 99.9999%). In some embodiments, the thresholds themselves are learned over time. For example, in the context of an automatic retail system where customer actions are monitored by cameras and other sensors rather than having human checkout clerks, it may be desirable to balance the confidence interval such that it is high enough that products taken by users are detected, but not so high that a substantial number of false positives occur (i.e., the user is charged for a product that he or she did not leave the store with, such as one detected when the user picks up a product, but then puts it back or leaves it somewhere else in the store). The business goal of such a store may be to have as many products taken by consumers detected as possible, but to keep the rate of false positives low enough that consumers are more likely to return to the store again and not avoid the store due to a negative experience and the hassle of seeking refunds for products that they did not actually intend to buy.

In such a scenario, the system may have an initial confidence interval of 80% (e.g., the confidence that a user actually picked up a product and left the store with the product). After a period of time, data analysis may reveal that a 10% loss of products without payment occurred (i.e., customers walking out of the store without the products having been detected). The data analysis may also reveal that the reported false positive rate was 0.1%. If the business determines that a higher false positive rate would be acceptable, but the product loss rate is not acceptable, the confidence interval of the ML model may be increased. Alternatively, the ML model may be provided with the maximum acceptable false positive and product loss rates, and may automatically increase the ML model confidence interval accordingly (e.g., raising it to 85%). This may be done periodically until the false positive rate becomes unacceptable, and lowered, raised, etc. periodically until the false positive rate converges towards the maximum acceptable rate. For instance, this may converge to a confidence that the user picked up a product of 99% and a false positive rate of 1%. Such a system may also detect changes in detection rates over time (e.g., reduced accuracy due to sensor degradation or failure, increased accuracy due to implementation of new sensors, etc.), and may adjust the confidence interval accordingly.

In certain embodiments, whether to turn a portion of a workflow on may be determined by calculating a pseudorandom number and comparing that number against a confidence value from an ML model (e.g., if at least the threshold, the portion of the workflow is turned on, and if not, the portion of the workflow is not followed). In this case, the workflow executed by a robot may vary from one execution to the next. This may be beneficial in swarm behavior, for example. In the scenario where a large number of drones are deployed (e.g., 100, 1,000, etc.), it may be desirable to have different and seemingly random effects. For instance, if a drone swarm is being used for concert lighting, and it is desired to have 70% of the drones randomly glow blue, 20% randomly glow yellow, and 10% randomly glow red each time a beat occurs in a song, this could be implemented using confidence threshold ranges in a probabilistic workflow. This provides a gating mechanism with multiple gates. Such embodiments may be trained via reinforcement learning, where the system explores new states with specified constraints and a reward function is used to seek a "winning" state. For instance, the reward function may involve increasing applause volume, new patterns may be explored, and characteristics of the drone patterns that increase applause may be learned.

In some embodiments, a "global" confidence values may be used that are based on "local" confidence intervals for multiple ML models. For example, three different ML models 1, 2, and 3 may be used for a task, such as image recognition, but the ML models may provide different outcomes. Consider the case where ML models 1 and 3 determine that an object in an image is a dog with 90% and 80% confidences, respectively, but ML model determines that the object is a cat with a 90% confidence, and the global confidence threshold requirement for positive detection is 50%. The object would be positively identified as a dog ((0.9+0.0+0.7)/3)=0.53333), but the identification as a cat ((0.0+0.8+0.0)/3)=0.26667) would fail. This is somewhat analogous to transfer learning, where the ML models may be applied for similar scenarios, but in a different context.

Different ML models may also have different accuracies for certain tasks. Thus, in certain embodiments, the confidence intervals of one or more of the models may be weighted. For instance, for invoice processing, ML model 1 may be assigned a 100% modifier, ML model 2 may be assigned a 70% modifier, and ML model 3 may be assigned a 50% modifier based on the accuracy of each model. However, for image detection, the accuracies and modifiers may be different.

In certain embodiments, the ML models may be monitored by a supervisor system to ensure that deployed robots using the ML model are operating as intended. This may be especially beneficial for mission critical systems. For example, if a robot is used in an aircraft to automatically control flight surfaces under certain conditions, operational parameters of the aircraft may be monitored. When reviewing data collected from aircraft where the deployed robot is operating, the supervisor system may determine a statistically significant anomaly, such as some pilots tending to pull back on the control wheel soon after the robot initiates the flight surface control. The supervisor system may then command the robot to disable a portion of the workflow, disable the robot entirely, provide a warning to pilots of the detected condition with a possible correction, etc.

Figure 1:
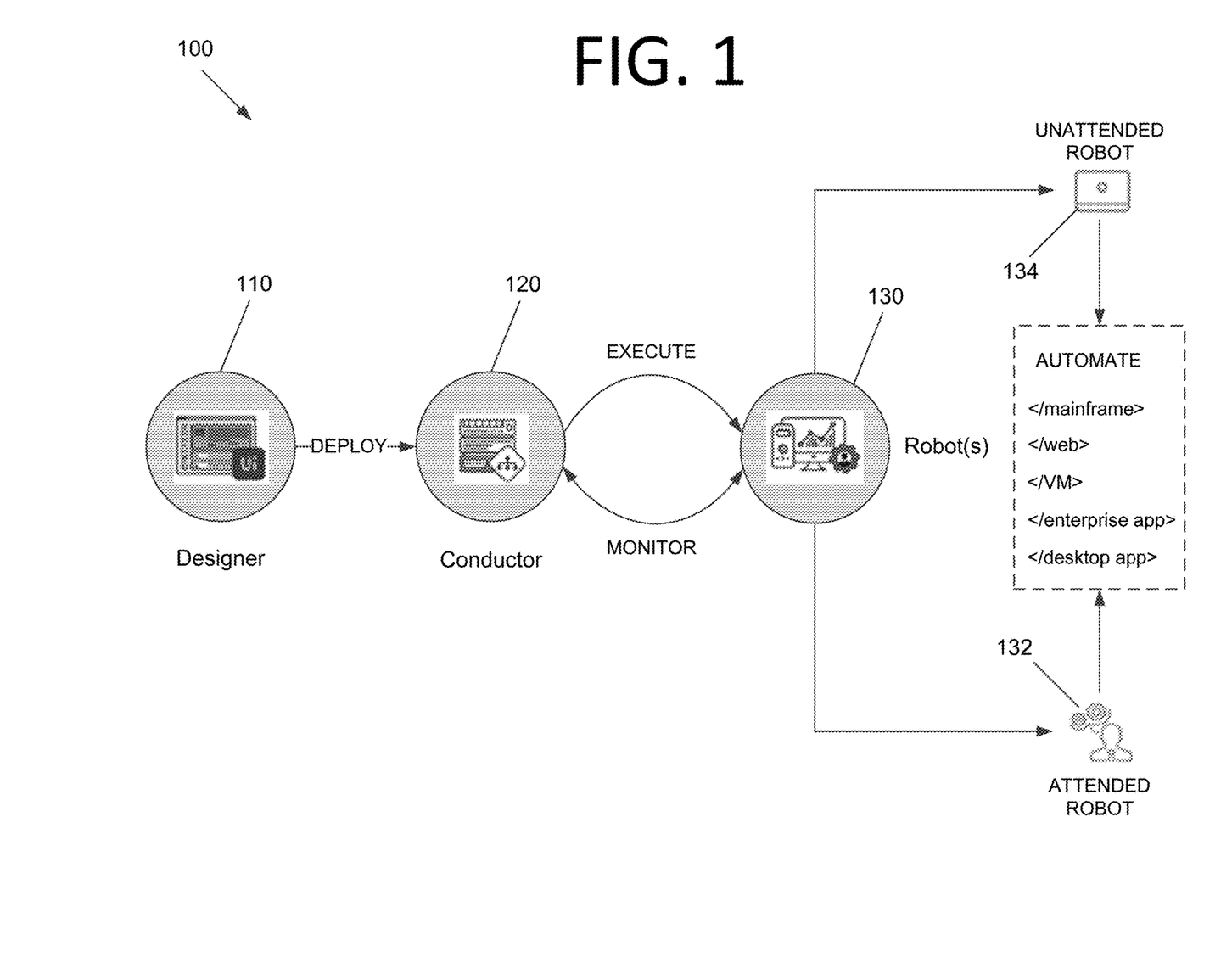
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
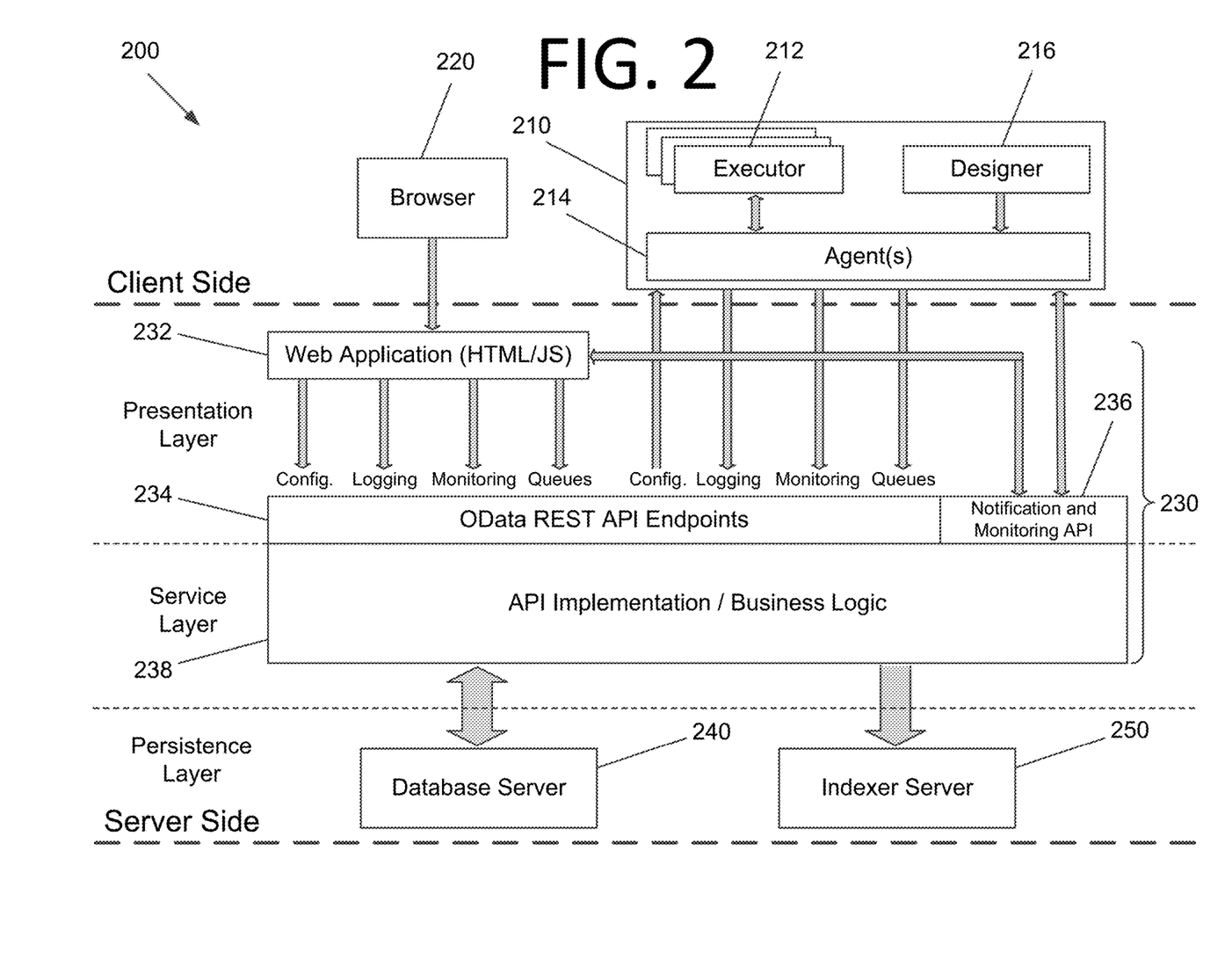
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
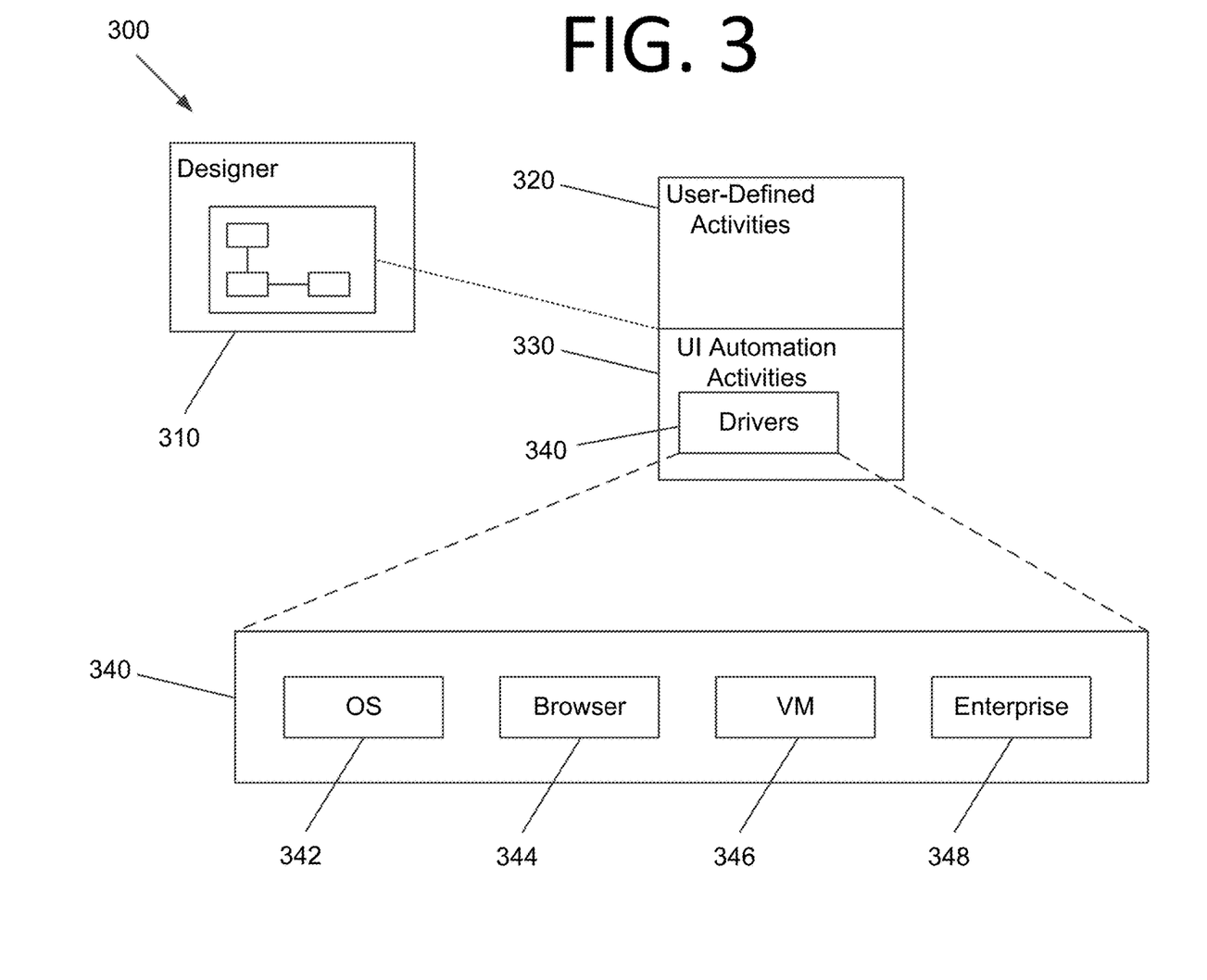
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
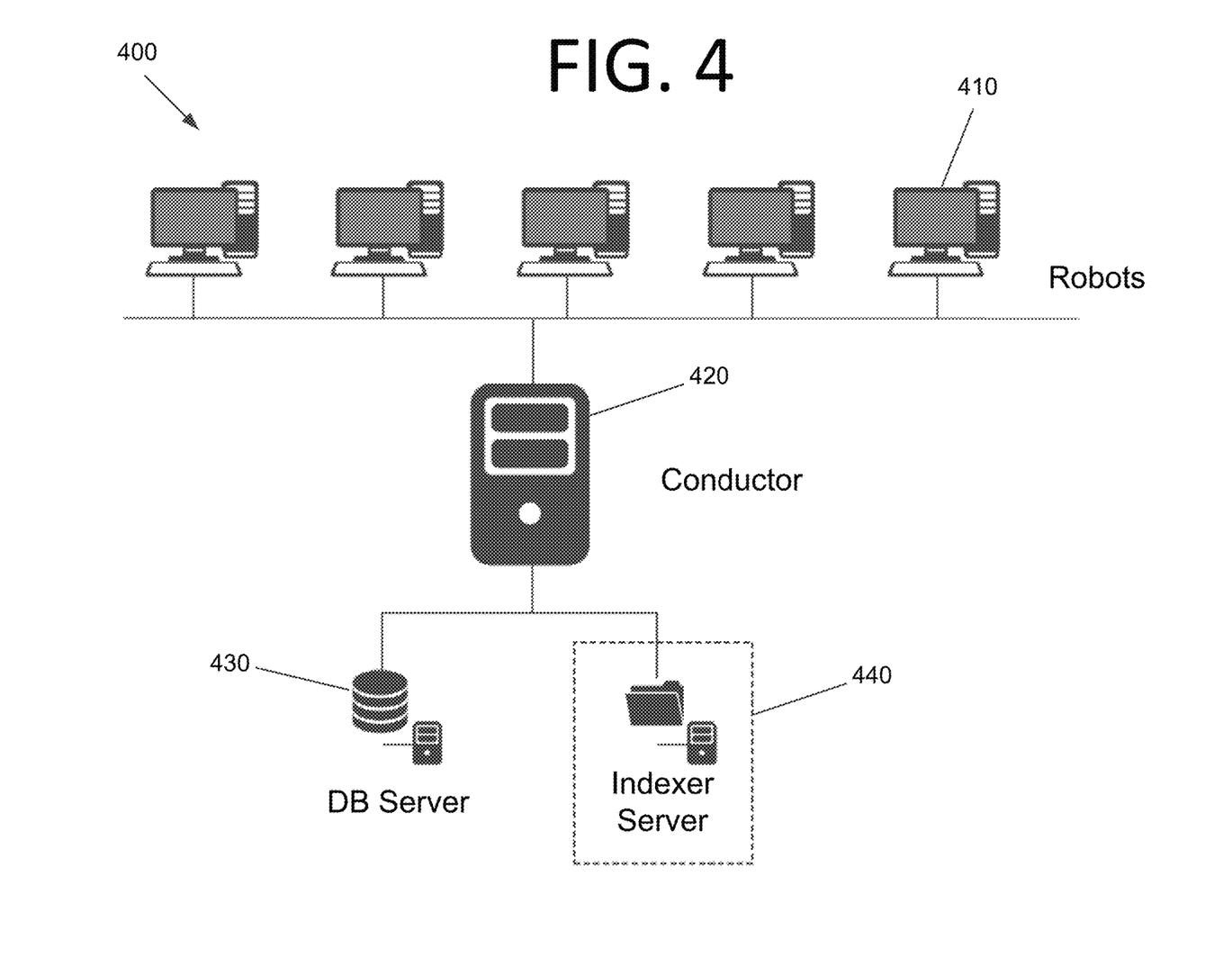
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
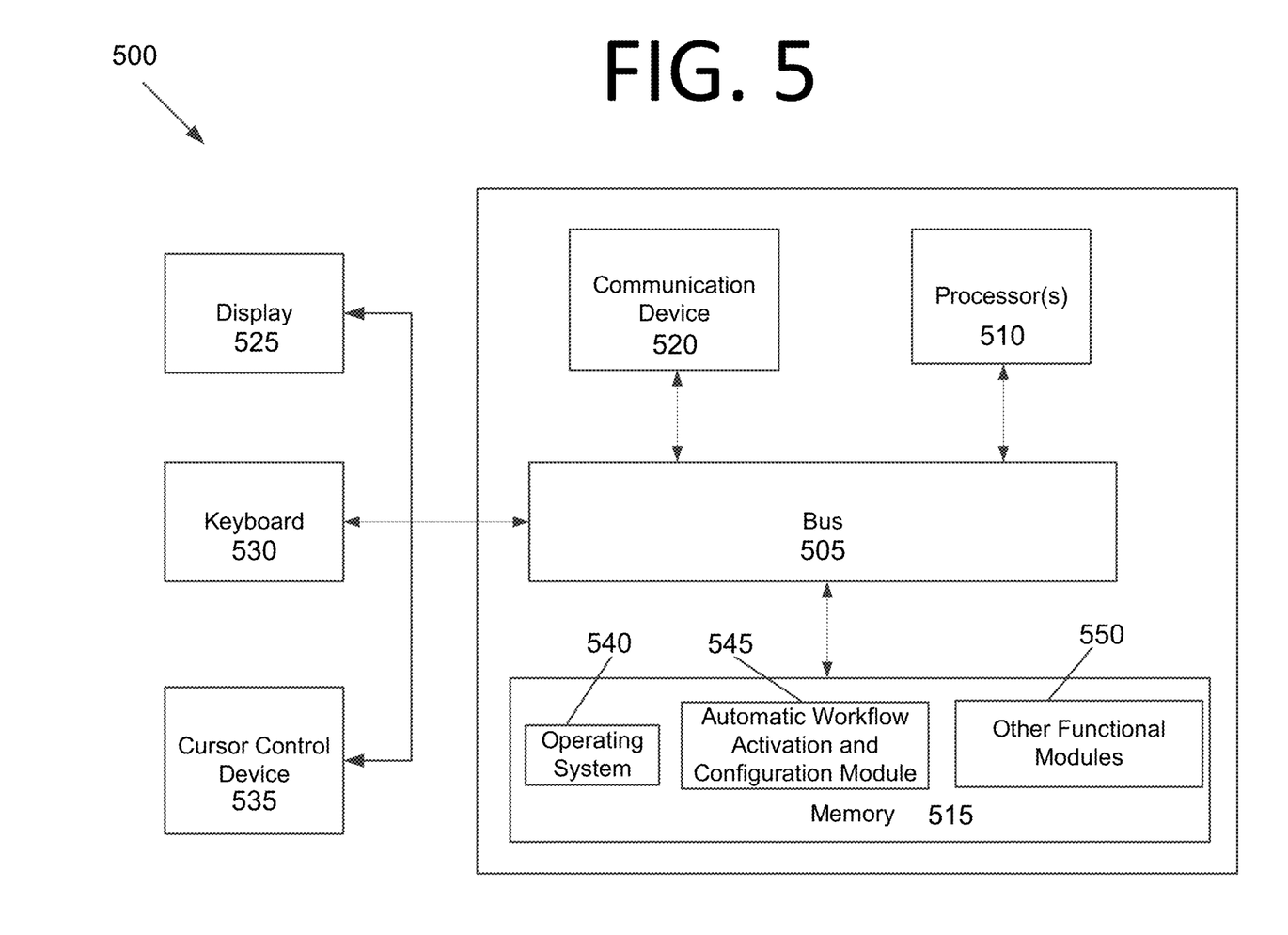
FIG. 5 is an architectural diagram illustrating a computing system configured to automatically activate and configure RPA workflows using ML, according to an embodiment of the present invention.

FIG. 5 is an architectural diagram illustrating a computing system 500 configured to automatically activate and configure RPA workflows using ML, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and/or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic workflow activation and configuration module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
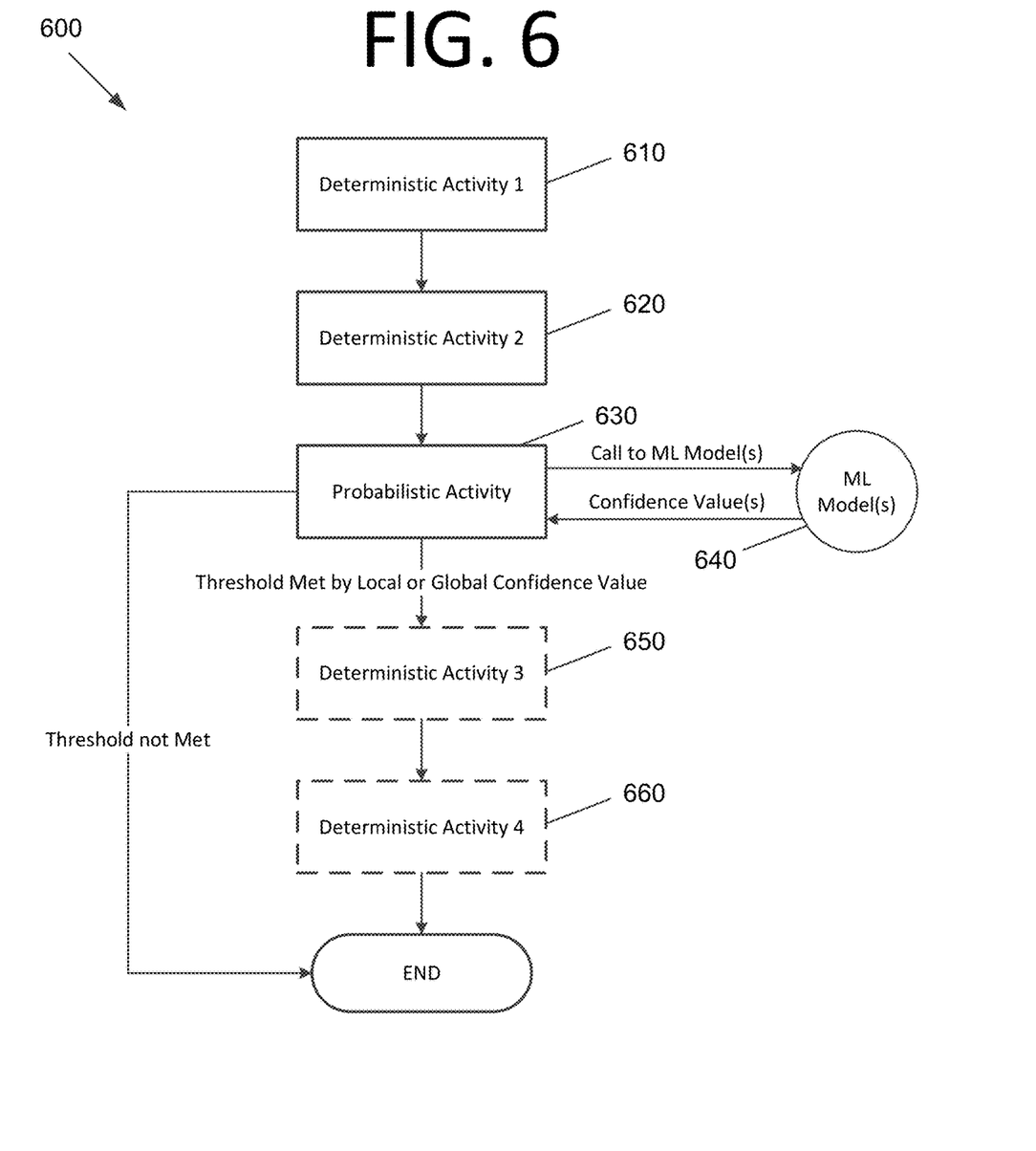
FIG. 6 illustrates an RPA workflow using ML for automatic activation, according to an embodiment of the present invention.

FIG. 6 illustrates an RPA workflow 600 using ML for automatic activation, according to an embodiment of the present invention. In RPA workflow 600, deterministic activity 1 610 always leads to deterministic activity 2 620, and deterministic activity 2 620 always leads to probabilistic activity 630. However, probabilistic activity 630 uses ML model(s) 640 to process data and return a confidence value. For instance, if ML model(s) 640 are trained to recognize cars in an image, and the confidence threshold is 70%, RPA workflow 600 will only proceed to deterministic activity 3 650 and on to deterministic activity 4 660 if this 70% confidence threshold is met. In this sense, a robot executing RPA workflow 600 turns steps 650 and 660 on or off based on the confidence threshold and the output from ML model(s) 640. Over time, the confidence threshold may be modified to better suit the scenario to which it is applied, the ML model may be retrained to be more accurate, etc.

In some embodiments where multiple ML models are used, the confidence values from each ML model may be combined to determine a global confidence value that is compared against the confidence threshold for the probabilistic activity. In certain embodiments, the global confidence value is determined by applying a respective weight to the confidence values of each ML model and combining the weighted confidence values. For instance, where three ML models are used, a weight of 50% may be applied to the confidence value from the first ML model, a weight of 30% may be applied to the confidence value from the second ML model, and a weight of 20% may be applied to the confidence value from the third ML model.

Figure 7:
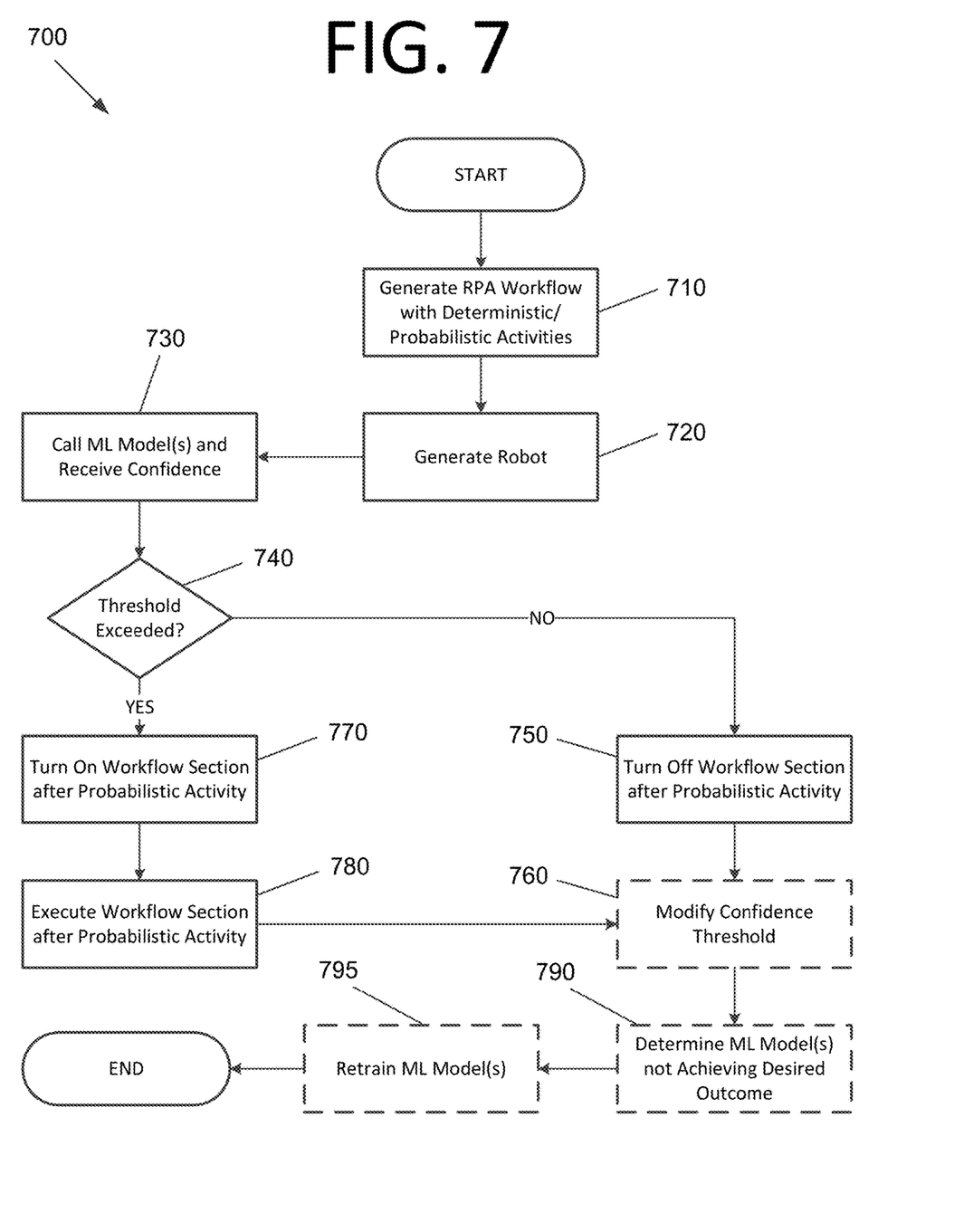
FIG. 7 is a flowchart illustrating a process for automatically activating and configuring RPA workflows using ML, according to an embodiment of the present invention.

FIG. 7 is a flowchart illustrating a process 700 for automatically activating and configuring RPA workflows using ML, according to an embodiment of the present invention. The process begins with generating an RPA workflow including a plurality of deterministic activities and at least one probabilistic activity that calls ML model(s) at 710. An RPA robot implementing the workflow is then generated at 720. The ML model(s) are called and confidence value(s) are received from the ML model(s) at 730. If the confidence value(s) do not exceed a confidence threshold at 740 (e.g., a single confidence value from an ML model, a global confidence value from multiple ML models, etc.), a workflow section following the probabilistic activity is turned off, not taken, or otherwise logically avoided at 750. Optionally, the confidence threshold may be raised and lowered at 760. In certain embodiments, the system may wait to modify the confidence threshold until the process of the workflow is run a predetermined number of times, a predetermined amount of time has passed, etc.

If the confidence value(s) exceed the confidence threshold at 740, the section of the workflow following the probabilistic activity is turned on, taken, or otherwise logically enabled at 770 and the workflow section after the probabilistic activity is executed at 780. Optionally, the confidence threshold may be raised and lowered at 760.

In some embodiments, modification of the confidence threshold may not achieve the desired results due to flaws in the ML model(s). For instance, taking the automatic retail system example above, consider the case that regardless of the modifications to the confidence threshold for a user taking an item to purchase after a predetermined number of adjustments (e.g. 20), the false positive rate remains unacceptably high (e.g., 5%). It may be determined at 790 that at least one of the ML model(s) is not achieving the desired outcome. The ML model(s) may then be retrained at 795. In the case that the RPA robot makes the determination, step 790 may include the RPA robot sending an indication to a server that retraining of the ML model(s) should be performed.

Figure 8:
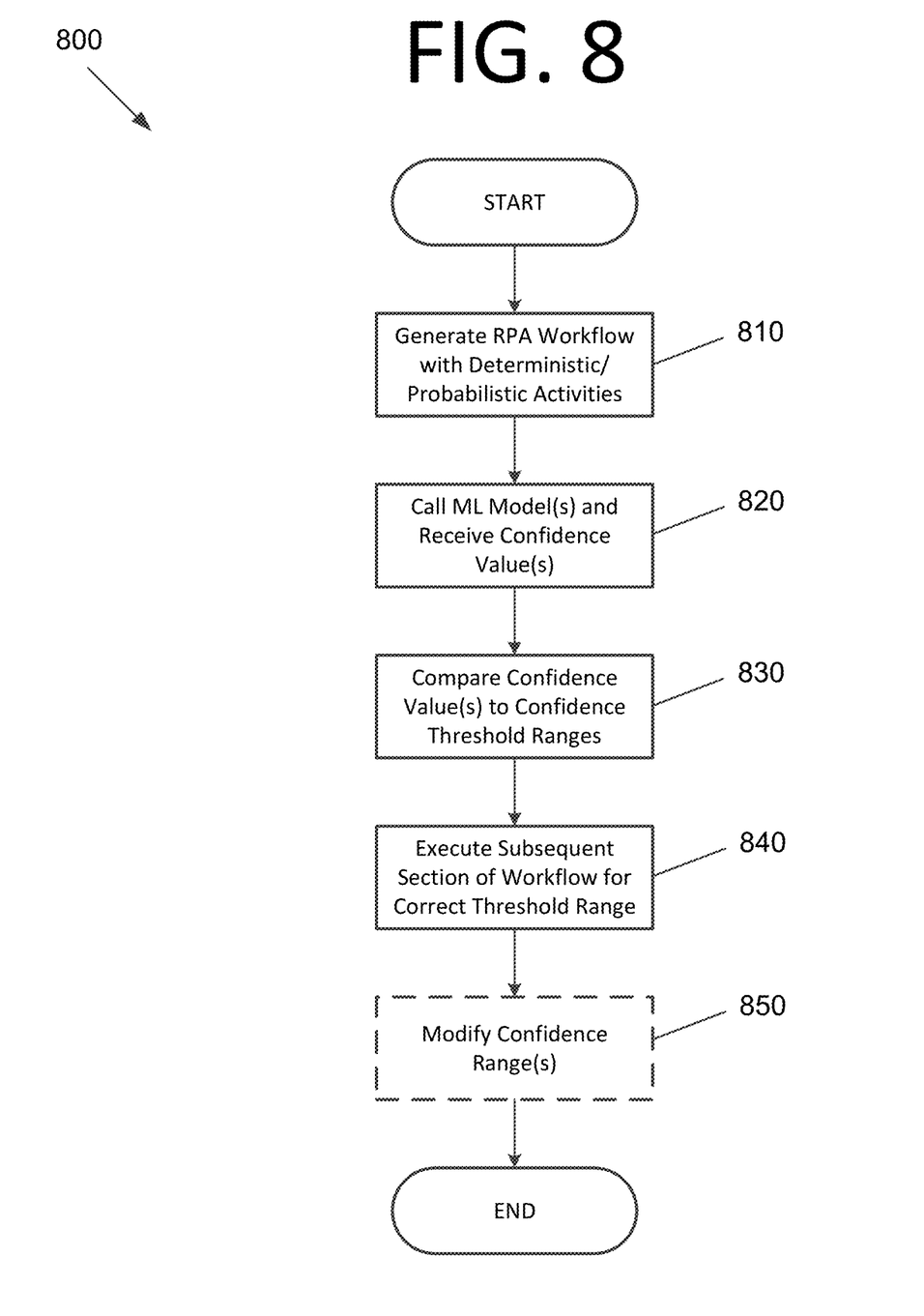
FIG. 8 is a flowchart illustrating another process 800 for automatically activating and configuring RPA workflows using ML, according to an embodiment of the present invention.

FIG. 8 is a flowchart illustrating another process 800 for automatically activating and configuring RPA workflows using ML, according to an embodiment of the present invention. The process begins with generating an RPA workflow including a plurality of deterministic activities and at least one probabilistic activity that calls ML model(s) at 810. The ML model(s) are called and confidence value(s) are received from the ML model(s) at 820.

After the confidence value(s) are received, the confidence value(s) are compared to multiple confidence threshold ranges at 830. The subsequent section of the workflow after the probabilistic activity corresponding to the confidence threshold range in which the confidence value(s) fall is then executed at 840. Optionally, one or more of the confidence ranges may then be modified at 850. The modification of the one or more of the confidence ranges may be repeated until a winning state is achieved.

In some embodiments, more complex mixes of deterministic and probabilistic activities may be used in a workflow. Indeed, any type and combination of deterministic and probabilistic activities may be taken without deviating from the scope of the invention. Indeed, in certain embodiments some portions of a workflow may be similar to FIG. 7 while others may be similar to FIG. 8.

The process steps performed in FIGS. 7 and 8 may be performed by a computer program, encoding instructions for the processor(s) to perform at least part of the process(es) described in FIGS. 7 and 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7 and 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
calling at least one machine learning (ML) model, by a robotic process automation (RPA) robot, when executing a probabilistic activity of an RPA workflow;
receiving, by the RPA robot, at least one confidence value from the at least one ML model;
responsive to the at least one confidence value not exceeding a confidence threshold:
turning off a workflow section after the probabilistic activity, by the RPA robot, via the probabilistic activity; and
responsive to the at least one confidence value exceeding the confidence threshold:
turning on the workflow section after the probabilistic activity, by the RPA robot, via the probabilistic activity, and
executing the workflow section following the probabilistic activity, by the RPA robot, wherein
the RPA robot, in the probabilistic activity, determines whether the at least one confidence value exceeds the confidence threshold, and
the turning on or off of the workflow section after the probabilistic activity comprises modifying activity parameters within the RPA workflow.

2. The computer-implemented method of claim 1, further comprising:

generating the RPA workflow comprising a plurality of deterministic activities and the at least one probabilistic activity configured to call the at least one ML model; and generating the RPA robot that implements the generated RPA workflow.

3. The computer-implemented method of claim 1, further comprising:

raising or lowering the confidence threshold, by the RPA robot, after the process of the workflow has been run a predetermined number of times.

4. The computer-implemented method of claim 3, wherein the raising or lowering of the confidence threshold by the RPA robot is repeated until a winning state is achieved.

5. The computer-implemented method of claim 3, further comprising:

determining, by the RPA robot, that the at least one ML models are not achieving an outcome after a predetermined number of modifications to the confidence threshold; and retraining the at least one ML models.

6. The computer-implemented method of claim 1, wherein the RPA robot is configured to determine how much of a certain resource to provide, determine a more optimal confidence threshold, or both.

7. The computer-implemented method of claim 1, wherein the RPA robot calls multiple ML models and the confidence values from each ML model are combined to determine a global confidence value that is compared against the confidence threshold for the probabilistic activity.

8. The computer-implemented method of claim 7, wherein the global confidence value is determined by applying a respective weight to the confidence values and combining the weighted confidence values.

9. A non-transitory computer-readable medium storing a computer program, the computer program configured to cause at least one processor to:

call a machine learning (ML) model while executing a probabilistic activity of an RPA workflow;

receive a confidence value from the ML model;

responsive to the confidence value not exceeding a confidence threshold, turn off a workflow section after the probabilistic activity, via the probabilistic activity; and responsive to the confidence value exceeding the confidence threshold:

turn on a workflow section after the probabilistic activity, via the probabilistic activity, and execute the workflow section following the probabilistic activity, wherein the RPA robot, in the probabilistic activity, determines whether the at least one confidence value exceeds the confidence threshold, and the turning on or off of the workflow section after the probabilistic activity comprises modifying activity parameters within the RPA workflow.

10. The non-transitory computer-readable medium of claim 9, wherein the computer program is further configured to cause the at least one processor to:

raise or lower the confidence threshold after the process of the workflow has been run a predetermined number of times.

11. The non-transitory computer-readable medium of claim 10, wherein the raising or lowering of the confidence threshold is repeated until a winning state is achieved.

12. The non-transitory computer-readable medium of claim 10, wherein the computer program is further configured to cause the at least one processor to:

determine that the ML model is not achieving an outcome after a predetermined number of modifications to the confidence threshold; and provide an indication to a server to retrain the ML model.

13. The non-transitory computer-readable medium of claim 9, wherein the computer program is further configured to cause the at least one processor to:

determine how much of a certain resource to provide, determine a more optimal confidence threshold, or both.

14. A computer-implemented method, comprising:

calling at least one machine learning (ML) model, by a robotic process automation (RPA) robot, while executing a probabilistic activity of an RPA workflow;

receiving, by the RPA robot, at least one confidence value from the at least one ML model;

comparing the at least one confidence value to a plurality of confidence threshold ranges, by the RPA robot;

modifying the confidence threshold ranges based on an applied scenario; and responsive to the at least one confidence value falling within a confidence threshold range:

turning on a workflow section after the probabilistic activity for that confidence threshold range, by the RPA robot, via the probabilistic activity, and executing the workflow section following the probabilistic activity for that confidence threshold range, by the RPA robot, wherein the RPA robot, in the probabilistic activity, determines whether the at least one confidence value exceeds the confidence threshold, and the turning on or off of the workflow section after the probabilistic activity comprises modifying activity parameters within the RPA workflow.

15. The computer-implemented method of claim 14, further comprising:

generating the RPA workflow comprising a plurality of deterministic activities and the at least one probabilistic activity configured to call the at least one ML model; and generating the RPA robot that implements the generated RPA workflow.

16. The computer-implemented method of claim 14, further comprising:

modifying one or more of the confidence threshold ranges, by the RPA robot, after the process of the workflow is run a predetermined number of times.

17. The computer-implemented method of claim 16, wherein the modification of the one or more confidence threshold ranges by the RPA robot is repeated until a winning state is achieved.

18. The computer-implemented method of claim 16, further comprising:

determining, by the RPA robot, that the at least one ML models are not achieving an outcome after a predetermined number of modifications to the confidence threshold range; and retraining the at least one ML models.

19. The computer-implemented method of claim 14, wherein the RPA robot is configured to determine how much of a certain resource to provide, determine a more optimal confidence threshold range, or both.

20. The computer-implemented method of claim 14, wherein the RPA robot calls multiple ML models and the confidence values from each ML model are combined to determine a global confidence value that is compared against the confidence threshold ranges for the probabilistic activity, and
the global confidence value is determined by applying a respective weight to the confidence values and combining the weighted confidence values.

\* \* \* \* \*